United States Patent [19]
Topar et al.

[11] Patent Number: 5,931,343
[45] Date of Patent: Aug. 3, 1999

[54] BEVERAGE DISPENSING APPARATUS HAVING CONSISTENT MIX DELIVERY OF BEVERAGE TO CONTAINER

[75] Inventors: William M. Topar, Glendale, Ariz.; Charles M. Fisher, Louisville, Ky.; Thomas J. Pfeifer, Louisville, Ky.; Krzysztof Struminski, Louisville, Ky.

[73] Assignee: Grindmaster Corporation, Louisville, Ky.

[21] Appl. No.: 08/996,432

[22] Filed: Dec. 22, 1997

(Under 37 CFR 1.47)

Related U.S. Application Data

[60] Provisional application No. 60/034,070, Dec. 24, 1996.

[51] Int. Cl.$^6$ ....................................................... B67D 5/56
[52] U.S. Cl. ............................. 222/56; 222/64; 222/129.3; 222/145.6; 222/189.06; 222/190; 222/413
[58] Field of Search ........................ 222/56, 64, 129.1, 222/129.3, 145.5, 145.6, 189.06, 190, 413

[56] References Cited

U.S. PATENT DOCUMENTS

| | | | |
|---|---|---|---|
| Re. 30,301 | 6/1980 | Zygiel | 137/564.5 |
| 3,266,670 | 8/1966 | Brooks et al. | 222/54 |
| 3,347,416 | 10/1967 | Hamilton | 222/56 |
| 3,643,835 | 2/1972 | Popinski | 222/56 |
| 4,160,512 | 7/1979 | Cleland | 222/56 |
| 4,324,494 | 4/1982 | Pryor et al. | 222/129.3 |
| 4,366,920 | 1/1983 | Greenfield, Jr. et al. | 222/145 |
| 4,488,664 | 12/1984 | Cleland | 222/56 |
| 4,830,508 | 5/1989 | Higuchi et al. | 222/56 |
| 5,588,557 | 12/1996 | Topar | 222/129.1 |

FOREIGN PATENT DOCUMENTS

| | | | |
|---|---|---|---|
| 0322729 | 7/1989 | European Pat. Off. | 222/64 |

*Primary Examiner*—Joseph A. Kaufman
*Attorney, Agent, or Firm*—Wheat, Camoriano, Smith & Beres, PLC

[57] ABSTRACT

The apparatus of the present invention pertains to a post mix multi-station dispensing apparatus which is isolated from the fluctuations experienced in using outside supplies of water. The apparatus is provided with a single reservoir of water and, associated with each serving station, a hopper storing powder flavorant, a metering device for metering the flavorant, a holding tank for holding a beverage to be dispensed at a predetermined rate at the associated serving station, and a water delivery system. While a beverage is being dispensed from the holding tank, the water delivery system delivers water from said reservoir at a rate essentially the same as the predetermined rate to a mixing area where the water and powder flavorant is mixed in a predetermined ration of powder flavorant-to-water ratio. This newly mixed beverage is added to the holding tank at the same rate as the beverage is being dispensed.

15 Claims, 6 Drawing Sheets

BEVERAGE DISPENSING APPARATUS HAVING CONSISTENT MIX DELIVERY OF BEVERAGE TO CONTAINER

This application is based upon Provisional Application Ser. No. 60/034,070 having a filing date of Dec. 24, 1996.

BACKGROUND OF THE INVENTION

The present invention pertains to beverage dispensing apparatus for the preparation and dispensing of a beverage and, more particularly to a beverage dispensing apparatus for the preparation of a beverage from a powder concentrate and direct dispensing of a quantity of the beverage upon demand.

Beverage dispensing apparatus, characterized by having a powder flavorant hopper from which a certain amount of flavorant is mixed with a measured amount of water to form a single service of beverage to be directly dispensed upon demand, have been in use for years for hot beverages. One example of a hot beverage single service dispensing apparatus is described in U.S. Pat. No. 3,266,670 in which a predetermined amount of water and powder flavorant are dispensed into a mixing chamber and then into a waiting receptacle. A similar operating device based upon demand is illustrated for hot coffee in U.S. Pat. No. 4,366,920. A significant advantage of such post mix apparatus is that it eliminates the need for storing large volumes of already made beverage within the apparatus.

Chilled or room temperature beverage dispensers that mix a powder flavorant with water and holding the same in a holding tank are also known. For example, U.S. Pat. No. 4,488,664 issued to Robert K. Cleland describes a dispenser with a single serving station. The dispenser has a powder flavorant hopper with an auger metering element housed in a member that can be placed directly over a mixing chamber and a holding tank for a beverage. The holding tank is quite large since it is to be used to dispense multiple servings of drinks over an extended period of time. While this construction is suitable for an apparatus for the dispensing of a single beverage, it is not compatible for multiple beverage dispensing devices, particularly where size is a significant factor as multiple tanks of the size contemplated in the Patent would occupy a significant counter area. The holding tank in the Patent is provided with an agitating device in the form of a magnetic driven impeller on the bottom of the tank to facilitate dissolution of the powder flavorant into the water. After a substantial amount of beverage has been dispensed, a sensing element in the holding tank senses that the level of beverage has dropped to a certain predetermined minimum level and the auger is driven at a rate proportional to the water delivery rate from a local water supply. The Patent states that few modern water supplies are subject to any appreciable change so a water regulator may not be necessary to hold the pressure and thus the flow rate constant. This has not been the experience of applicants, however, as water pressures do fluctuate significantly enough to distort the taste of beverages and water regulators are typically needed. This is particularly true with respect to rural or overseas regions, elevated areas, or high structures.

For dispensing apparatus that serve multiple stations, each serving a different beverage, the flow rate of water is extremely important as small changes in the rate to the mixing area or chamber can dramatically alter the taste of the beverages delivered to the consumer. Studies have shown that consumers will quickly refrain from use of the dispenser once a poor quality drink has been dispensed. Moreover, the size consideration becomes important. While it is advantageous to use a powder flavorant post mix dispenser since it reduces the need to transport an already mixed volume of the beverage itself or syrup concentrate made from a powder flavorant to the dispensing apparatus and pour the same into the top thereof and all the concomitant hygiene problems associated with the handling of premixed beverages, the advantages thereof rapidly become less if significant quantities of the mixed beverage are required to be held within the apparatus as, for example, in the aforementioned U.S. Pat. No. 4,488,664. This advantage is further destroyed if the apparatus is to serve multiple dispensing stations with like amount of different beverages.

It is therefore a paramount object of the present invention to provide for a dispensing apparatus capable of serving beverages at a plurality of beverage dispensing stations avoiding the fluctuations in water pressure from local water supplies. It is still another important object of the present invention to provide for a constant and consistent water flow rate to all water demanding components of the dispensing apparatus. It is still a further object of the present invention to provide for a dispensing apparatus that has a constant and consistent flow rate when beverages are being simultaneously dispensed at more than one serving station. It is yet another object of the present invention to provide for a dispensing apparatus in which the beverage dispensing rate is matched by the water flow rate to a mixing chamber where the beverage is mixed and the is moved to a holding tank for the beverage.

SUMMARY OF THE INVENTION

A multi-serving station beverage dispensing apparatus constructed in accordance with the present invention has a single water reservoir that provides water to the mixing chambers associated with all of the serving stations of the apparatus. The various components associated with each of the serving stations include storage hopper for the powder flavorant and a metering device, a mixing bowl for receiving water from the reservoir and powder from the storage hopper as metered by the metering device, and a holding tank for receiving and holding the beverage mixed by the mixing chamber. Each serving station is provided with a valve structure that when actuated dispenses a beverage from the holding tank of the selected station into a serving receptacle.

The reservoir is constructed in such a manner and positioned within the apparatus so as to provide water pressure sufficient to establish a flow rate of water to the mixing chamber that matches the beverage dispensing rate from the holding tanks. The metering device is timed to meter powder flavorant to the mixing chamber at a rate sufficient to provide the desired powder flavorant to water ratio needed to make the appropriate beverage for the holding tank. Each holding tank is provided with a sensing element that signals when beverage is being dispensed so that a controller activates the metering element and opens a valve in the water line connecting the mixing chamber and water reservoir. Mixing of the beverage and the exact volume replacement of the dispensed beverage continues as long as the beverage is being dispensed.

DETAILED DESCRIPTION OF THE PREFERRED EMBODIMENT

Figure 1:
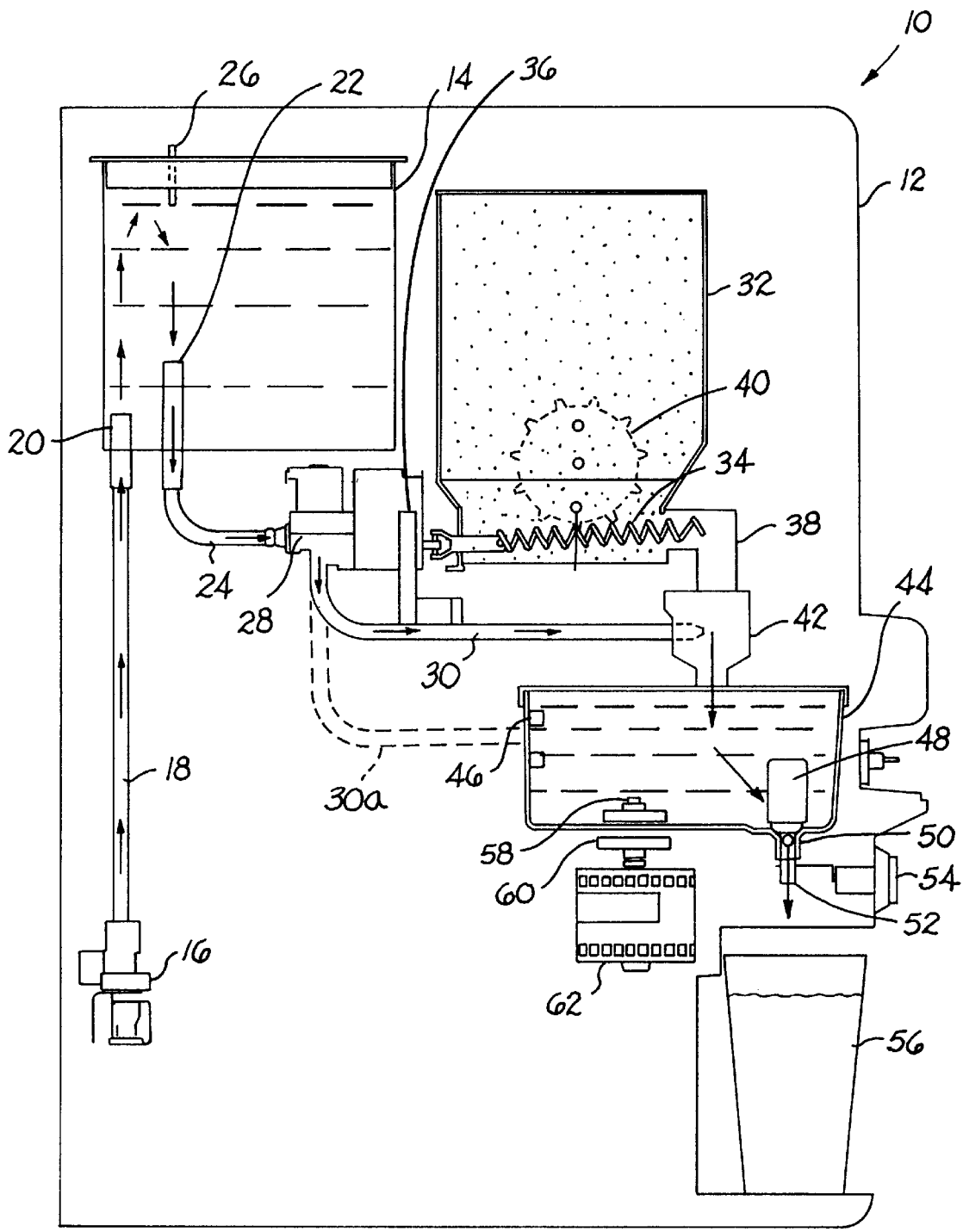
FIG. 1 is a schematic in side view of a preferred embodiment of a beverage dispenser in accordance with the present invention.

From the side view of FIG. 1, it may be seen that the dispenser of the present invention is depicted generally by the character numeral 10 with all of the components thereof being encompassed by a cabinet 12. A single water supply reservoir 14 is connected by valve 16 and water line 18 to an outside source of water (not shown). A reservoir 14 is connected to all of the appropriate components of each dispensing unit of multiple beverage dispenser apparatus and elevated with respect to all of the beverage making and dispensing components of the dispenser 10 to establish a hydraulic head of a predetermined pressure at its outlet for the delivery of water. The structure needed to provide the needed water pressure is discussed in more detail below. While not shown, it is contemplated that the reservoir could also serve as a cooling region for the water and thus be surrounded by cooling coils and the like to provide the refrigeration required.

Figure 2:
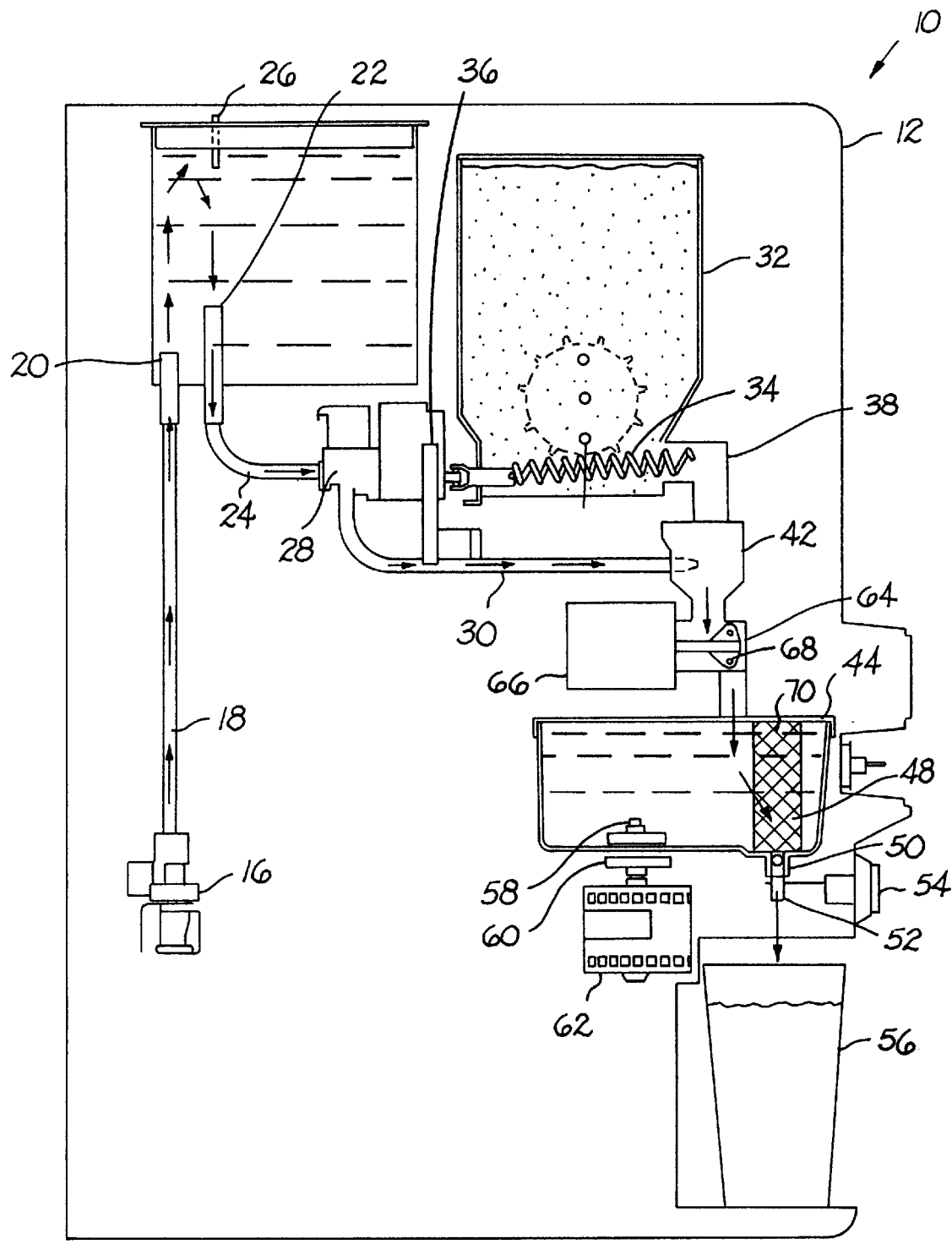
FIG. 2 is a schematic in side view of a variation of the preferred embodiment of the present invention having a whipper mechanism for added mixing of the beverage.
Figure 3:
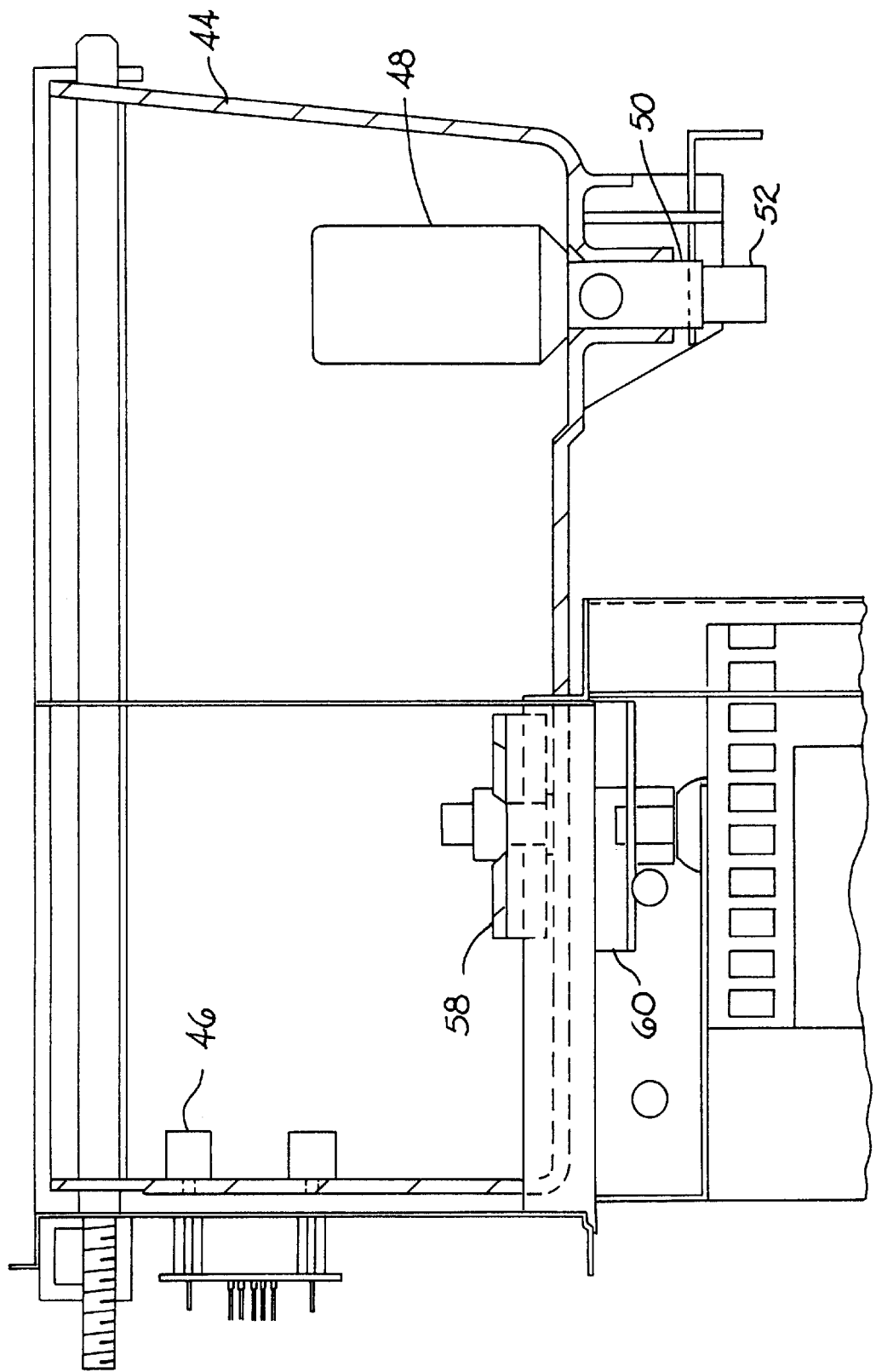
FIG. 3 is an expanded side view of a beverage tank and a dump valve used in the present invention.

FIGS. 1–3 are limited to a single beverage dispensing unit as opposed to an apparatus having a plurality of serving stations. Those components of the various stations that merely are duplicative are not shown. The operating sequence discussion and flow diagrams of FIGS. 6 and 7, however, do pertain to a multiple beverage dispensing apparatus.

Referring back to FIG. 1, elevated reservoir 14 is provided with an inlet communicating with line 18 and an outlet 22 communicating with line 24. A water level sensor 26 monitors the level of water within reservoir 14. Line 24 leads to a solenoid operated valve 28, located as part of a single manifold containing a water splitter and multiple solenoid operated valves. Valve/manifold 28 in turn is in communication with water line 30. Again, it should be understood that the splitter portion of the manifold is to provide water to each dispensing unit of multiple beverage dispensing apparatus. While it is contemplated as an economic measure and good engineering technique to have a single manifold that splits the water from the reservoir 14 to the various solenoid operated valves, the reservoir 14 could also be connected by individual lines and solenoid operated valve to the various beverage servicing stations.

It is essential for a proper working beverage dispenser that the taste quality of the beverage being dispensed be consistent in quality and have the mix ratio set by the beverage manufacturer. This is a prime function of the reservoir 14 which maintains a needed hydraulic head to maintain an accurate water flow rate under conditions where the incoming water pressure changes or is different from location to location and where demand for water to be delivered to the various apparatus components is great. The importance of providing an accurate water flow rate cannot be overly stressed since changes in water flow rates detrimentally affect the desired water to powder flavorant ratio. By providing a reservoir that maintains an essentially constant water pressure at its outlet, has a volume that exceeds the normal quantities of water needed to simultaneously provide beverages at several stations, and has automatic refill capabilities as water is drawn below sensor 26, the system can provide accurate and matching water flow rate to other parts of the dispenser when required. Moreover, the beverage dispenser apparatus is isolated from a remote water system such as a community water supply where the water pressure varies considerably due to use and from one supply to another. Additionally, the water in the reservoir being retained for a period of time has an increased opportunity to reach a predetermined temperature as opposed to water coming directly from a remote supply that is mixed with the powder and then dispensed. The latter situation will result in inconsistent dissolution rates and detrimentally affect the taste of the dispensed beverage.

Each beverage servicing station is provided with a hopper 32 for containing the powdered flavorant. It is desirable that the powder be dry in nature, thus free flowing and easily metered in amounts appropriately consistent with the flow rate of water to make a beverage having the required powder flavorant-to-water ratio. Positioned within the bottom portion of hopper 32 is a metering auger 34 driven by a motor 36 that is designed to move the powder flavorant in a predetermined amount toward one end of a metering elbow 38. A pinned wheel 40 designed to couple and move with the auger 32 is pivotally mounted within the hopper 32. Wheel 40 functions to break up any agglomerations occurring in the powder, minimizes bridging over the auger 34, and facilitates the smooth flow of flavorant into the helix of the auger. The other or lower end of the elbow 38 communicates with the top of mixing chamber 42 and the powder flavorant moved into the elbow falls by gravity into the chamber 42.

The water from valve 28 and the powder flavorant from elbow 38 are mixed together in a funnel-shaped chamber 42. Chamber 42 is typical of mixing chambers of the prior art in which the water is introduced radially into the chamber and caused to swirl and be otherwise turbulent within the chamber 42. The powder is metered into the top of chamber and is swirled about the chamber and caused to largely dissolve within the water before the beverage solution exits under gravity into the beverage holding bowl or tank 44.

Alternatively, the water may be introduced directly into the holding tank 44 against one wall thereof as shown by the dotted line depicting water line 30a in FIG. 1. Metering elbow 38 would extend directly into the holding tank 44 where the beverage would be formed. This variation would eliminated the need for a mixing chamber 42.

The capacity of tank 44 is volumetrically designed to hold a single serving of at least the largest quantity of a beverage to be dispensed, for example, 48 ounces of beverage, yet limited not to exceed significantly this capacity so as to not unduly increase the total size of the apparatus. Thus, in this example, the volumetric capacity of each beverage tank should be about 48 fluid ounces. Typically, this capacity would be about three times larger than the volume of the most frequently dispensed drink of about 16 fluid ounces. To ensure that the predetermined capacity of tank 44 is maintained or replenished following the dispensing of a single serving, high/low sensors 46 may be used in conjunction with a controller (discussed below) to cause the associated valve of manifold 28 to open for a predetermined time period. Sensors for the sensing of the presence or absence of a liquid are well known in the prior art and may be found in the aforementioned U.S. Pat. No. 4,488,664 or in U.S. Pat. No. 5,195,422 assigned to Grindmaster Corporation.

In addition, tank 44 is provided with a dump valve 48 positioned over the outlet 50 to nozzle 52 as perhaps is best seen in FIG. 3. Dump valve 48 is coupled to push button 54 visibly mounted on the exterior of cabinet 12. Pressing of button 54 either mechanically (shown) or electrically (not shown) causes the valve 48 to remain open as long as the button is depressed but the flow of liquid stops almost instantaneously when the button is released. The mechanics and the use of a dump valve in the beverage dispensing industry are well known. Basically, a dump valve is a weighted member designed to sit in a liquid tight relationship under gravity within a liquid outlet. It may be mechanically levered to an operating button so that when the button is depressed the valve body is lifted away from the seat and the liquid can flow through the outlet. Release of the button allows the valve body to fall back into the seat, cutting off flow.

To provide for a continuous stirring of the contents of tank 44, a bladed impeller 58 is mounted for rotary motion on the bottom interior surface of tank 44 and magnetically coupled to a rotating magnet 60 driven by motor 62. Magnet 60 is mounted in close proximity to the bottom exterior surface of tank 44 so that it can effectively magnetically couple with impeller 58. Such magnetic coupled impellers are well known in the prior art as illustrated by the aforementioned U.S. Pat. No. 4,488,664.

The holding tanks 44 further serve the function of holding the beverages for a period of time until the newly mixed beverage reaches the optimum "taste". Consumers often complain about the cloudy appearance and "tasteless" of a newly mixed beverage. It has been found that it takes newly mixed beverages made from a powder concentrate a short period of residency time before the proper pH level equating to optimum taste has been reached and/or the cloudy appearance vanishes. So it is preferable that the beverage sit for this short period of time (up to two minutes) before being dispensed. Since the holding tanks hold up to the largest amount of beverage to be dispensed at one time and are filled as rapidly as beverage is being dispensed, back-to-back dispensing at a single station will not present a problem with respect to the residency time as the period taken to fill the first serving receptacle will allow sufficient residency time to occur for all but a very few type of beverages. Moreover, as is evident from the drawing, holding tanks are filled with newly mixed beverage from the top and dispenses the beverage from the bottom. As will be discussed below in more detail, the holding tanks are filled at the rate of dispensing so that tanks remain at essentially the same level at all times with the newly mixed beverage having sufficient time to reach the desired pH level.

Certain powder flavorants may be less soluble than others. To further ensure the proper dissolution of the powder flavorant in the water, use may be made of an additional aid in the dissolving of such powders such as whipping chamber 64 as shown in FIG. 2. Whipping chamber 64 is mounted below and in communication with the mixing chamber 44 and houses high speed rotating blades 68 driven by a motor 66. The liquid from the chamber 44 flows into the chamber 64. The whipping action of blades 68 further assist in the dissolution of the powder flavorant into the water before the beverage solution empties into tank 44. Use of whipping chambers to aid in the dissolution of powder flavorants are well known in the beverage dispensing industry.

To ensure undissolved particles are not dispensed in to container 56, a filter basket 70 may be optionally positioned over the dump valve 48. A removable, cylindrically shaped filter basket 70 having a fine mesh screen may be placed on the bottom of tank 44 circumscribing the dump valve 48. Basket 70 has sufficient length to extend above the surface of the liquid at maximum level. The mesh screen is designed to intercept and halt the movement of undissolved sugar particles and the like flowing through the open outlet. By holding the particles stationary with respect to the flowing liquid, basket 70 accelerates the dissolution of the particles into the liquid.

It is preferable that the reservoir 14 have a width and depth equal to or greater than its height so that the height of the water volume above the reservoir outlet, and thus the water pressure itself, is largely unaffected by the replacement of one or more dispensed beverage volumes in the beverage holding tanks even if the dispensing at the various stations is occurring simultaneously. A tall and slender reservoir would be much more likely to demonstrate significant pressure changes at the outlet 22 and at the mixing chamber 42 under such conditions due to a more rapid change in height of water above the outlet 22 than would be experienced by a more shallow height but wider reservoir 14 such as shown in FIG. 1. In other words, a wide reservoir demonstrates less sensitivity with respect to pressure changes per given change of the volume of the water therein as compared to a taller reservoir with less horizontal cross-sectional area for the same change in water volume. Additionally, it is important that the total volume of the reservoir reserved for the storage of water exceed the sum of the collective volumes of all of the holding tanks reserved for the storage of beverages. While there is no theoretical upper limit to the reservoir volume, practical limitations due to size constraints of the apparatus itself dictate that the volume of the tank should not exceed about 3 gallons, preferably about 2 to 2½ gallons or 256 to 320 fluid ounces. Because the water capacity of the reservoir exceeds the sum of the all of the beverage volumes of the holding tank volumes, simultaneous dispensing can be accommodated and the water level in the reservoir is easily maintained through opening of valve 16 to the outside source.

The flow rate of the water from reservoir to the holding tank is largely a function of the pressure of the water at the outlet of the reservoir and the internal diameter of the water connecting lines of the dispensing apparatus from the reservoir to the mixing chamber. A desirable dispensing flow rate to the waiting receptacle of a customer from the beverage holding tanks has been determined to be about 2 fluid ounces per second of beverage. Since the flow rate of water to the mixing bowl is largely dependent upon both the pressure of the water provided by the reservoir and the internal diameter of the connecting lines, the structures necessary to provide that flow rate can easily be calculated to match the beverage dispensing flow rate from the holding tank. Because the internal diameter of the water connecting lines are typically standard, for example, ⅝th to 5/16th inches I.D., the more practical and preferred approach is to design the apparatus with a reservoir having the dimensions as stated above and positioned in the apparatus such that the bottom of the reservoir with the outlet is at an elevation that would provide the pressure needed to establish the matching water flow rate into the mixing chamber. When designing an apparatus of the present invention, the calculations, taking into consideration size constraints, would determine a gross water pressure needed to provide the predetermined and desired flow rate to the point of mixing by using the internal diameter of the water connecting lines, the pressure that a column of water from a reservoir filled to the desired capacity would provide at the outlet, and the elevation of the outlet above the point of mixing. Once the apparatus is constructed in accordance with the calculations, any small variations in the flow rate from the desired rate can be accomodated by appropriate positioning of the water sensor in the reservoir tank to change the height of the column of water in the reservoir.

Figure 4:
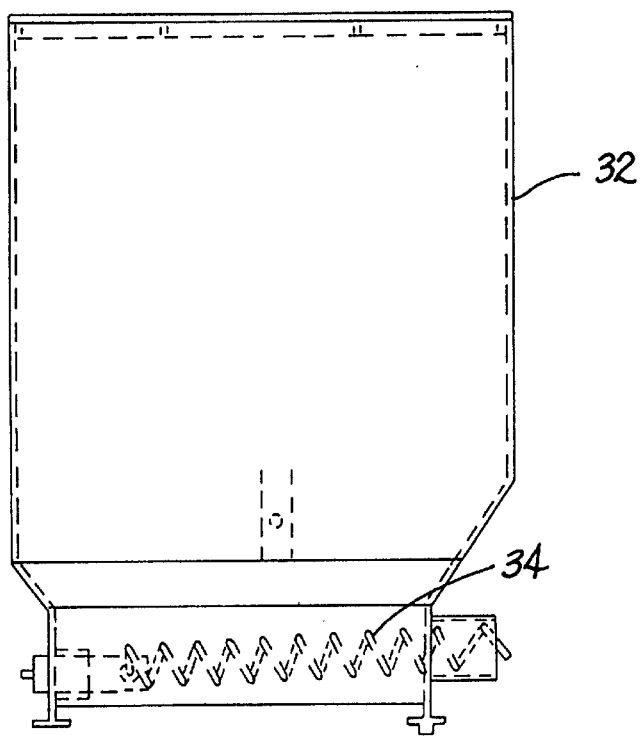
FIG. 4 is a side view of a hopper used in the present invention.
Figure 5:
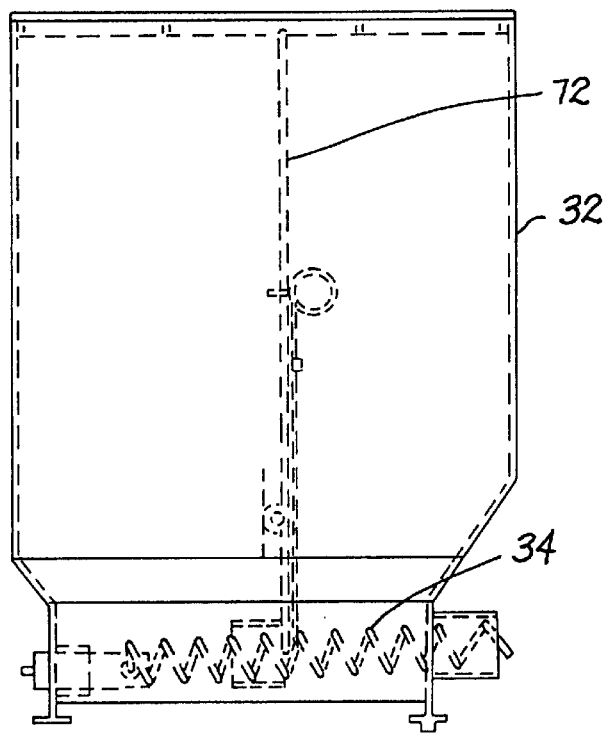
FIG. 5 is a side view of a hopper used in the present invention for highly concentrated powder flavorants.

The view of FIGS. 4 and 5 of a hopper with and without a divider 72. In some instances where, for example, it may be desirable to use a highly concentrated powder flavorant, a certain amount of wastage may occur with a hopper as shown in FIG. 4 when the remaining powder in the hopper is removed and replaced. This wastage of powder can be substantially reduced by the insertion of a divider 72 as shown in FIG. 5 that cuts down of the powder needed to prime the auger 34. Less waste is thus realized when flavors are changed.

Figure 6:
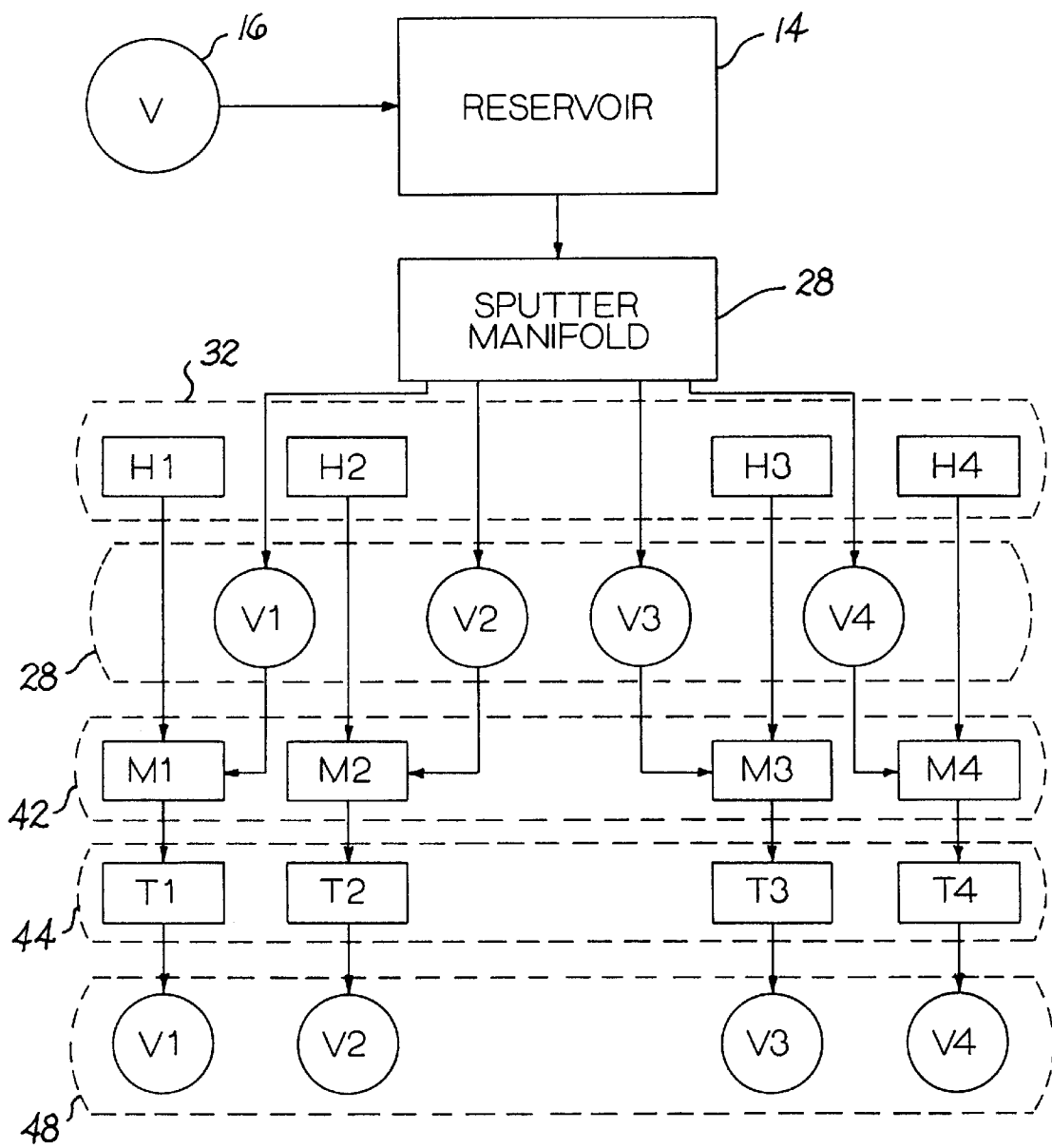
FIG. 6 is a flow diagram of the water and powder constituents of the beverage.

The flow chart of FIG. 6 depicts the flows of liquid and powder for a four station beverage dispenser in accordance with the present invention. As illustrated water from an outside source is introduced into the elevated reservoir tank 14 that supplies the water for the entire dispenser under the hydraulic head of the tank 14. Water flows by gravity under the pressure head from tank 14 through any one of the open valves of splitter/manifold 28 to an associated mixing chamber 42. The water flow rate to the mixing chamber, as described above, is made to match the beverage dispensing rate. Simultaneously, the powder flavorant is metered from a hopper associated with the open valve 28 to the associated mixing chamber 42. The resulting beverage mixed in the chamber 42 then falls under gravity into an associated tank 44 where it remains until the associated dump valve 48 is open by the customer/consumer.

Figure 7:
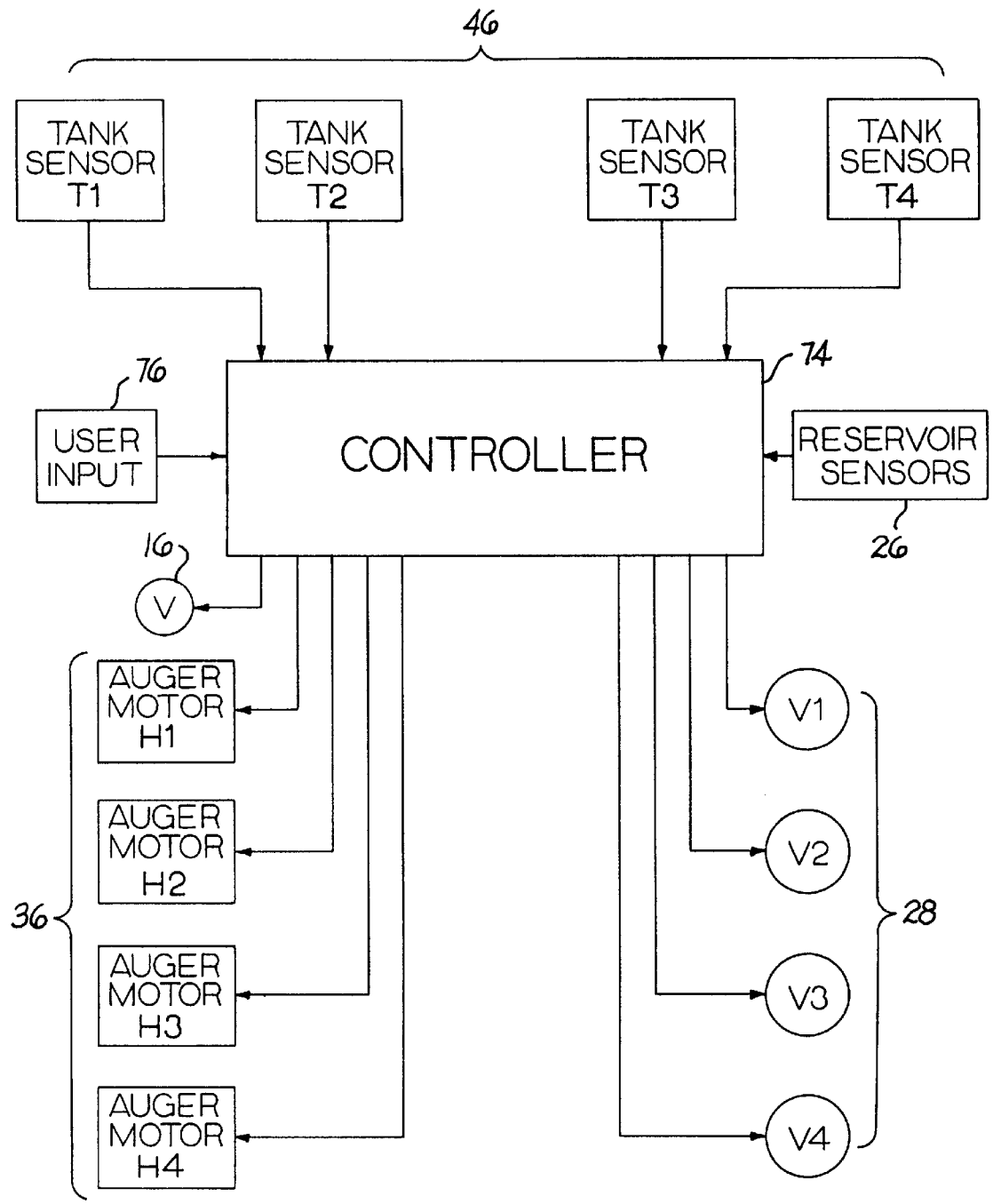
FIG. 7 is a flow diagram illustrating the various outputs and inputs of a controller used in the present invention.

The control flow chart of FIG. 7 is illustrative of the control network for a four beverage station dispenser. A controller 74 which may, for example, be a programmable microchip or a desk top type computer, controls the rotational rate and the time of operation of each of the auger motors 36 and the opening/closing of valves 16 and 28. The rate at which the auger provides powder flavorant is proportional to the flow rate of the water with the precise ratio being dictated by manufactures' suggested powder flavorant to water ratio for a particular beverage. It should be understood that the controller 74 may operate the various stations to provide similar or distinctly different mix ratios to the various tanks as set in the delivery rate at each auger metering device or in accordance with the programmed instructions received a from user input 76 to the controller 74. Controller 74 receives various input signals from the reservoir sensors 26 and the tank sensors 46. In responsive to a low water level signal from sensors 26, controller 74 opens valve 16 to the outside water source line until the water reaches a predetermined water level within reservoir as determined by sensors 26. When a consumer depresses one of the push buttons 54 opening a valve 48, the beverage level in the associated tank 44, i.e., the tank of that beverage station, drops causing sensor 46 after a very short delay (to prevent) constant on-off of the valves and motors) to provide a low liquid level signal to controller 74. Controller 74 causes the associated auger motor 36 to rotate its auger 34 at a predetermined rate to meter the powder flavorant into the associated mixing chamber 42. The amount of powdered flavorant metered into the mixing chamber is in a precise ratio to the quantity of water that flows into the maxing chamber to replace the beverage dispensed from tank 44. Simultaneously, controller 74 opens the associated valve 28 for a predetermined time period to allow a precise amount of water to flow from reservoir 14 into the associated mixing chamber 42. The resulting beverage thus falls into the associated tank 44 chamber at a rate that matches the rate of the beverage being dispensed from the tank through the opening of the dump valve.

From the above, it can be seen that a flow rate into the mixing chamber is maintained consistent at all times thereby ensuring that the proper powder flavorant to water ratio is also consistent. As stated before, the importance of being able to accomplish this cannot be overly stressed since varying flow rates to the mixing chamber will dramatically alter the ratio of powder flavorant to water and thus the taste of the resultant beverage. Moreover, the flow rate into the mixing chamber essentially matches the beverage dispensing rate into the beverage holding tanks thus maintaining the beverage level essentially constant in each beverage tank. The holding tank functions to hold a limited volume of the newly mixed replacement beverage for a length of time sufficient for the proper pH level to be reached. The volume is limited to that volume necessary to fill the largest drink customarily served. In accordance with the teachings of the description above, the desired matching and consistent flow rate is provided without the use of flow regulators and pressure tanks. This is accomplished by isolating the apparatus from the fluctuations of water pressure experienced by those dispensing apparatus of the prior art connected directly to local water supplies through the use of a water reservoir tank providing water to all points at which beverages are mixed within the apparatus. The reservoir is further structured to have an appropriate capacity, dimensions, and position within the apparatus to provide a predetermined pressure compatible with the connecting water lines to provide the matching water flow rate. Thus, it may be seen that the apparatus of the present invention addresses the problems of the prior art and meets the objectives as set forth above.

Those with ordinary skill in art of beverage dispensing will understand and appreciate that many variations can be made without departing from the spirit and scope of the claims as presented below. For example, various powder metering devices may be employed and substituted for augers including slide valves and camera type orifices. Various other types of mixing chambers may be used to mix the powder flavorant and water. Reservoirs of configurations other than parallelpiped such as for example, cylindrical, may be employed as well to meet the pressure value required to provide the proper and consistent flow rates into the mixing chamber.

We claim:

1. An apparatus having a plurality of beverage serving stations for the selective preparation of a plurality of beverages and dispensing said beverages at respective serving stations comprising
   (a) a reservoir for water and an outlet, said reservoir establishing a predetermined water pressure at said outlet;
   (b) beverage preparation and holding components associated with each serving station including
      (i) a hopper associated with each serving station for the storing of powder flavorant,
      (ii) a metering component associated with each serving station for the metering of said powder flavorant,
      (iii) a mixing area associated with each serving station for receiving said powder flavorant from said metering component and mixing powder flavorant with water delivered from said reservoir to form a beverage for said associated serving station,
      (iv) a water delivery system associated with each serving station for the delivery of water from said reservoir to said mixing chamber at a predetermined rate, said metered powder flavorant and said delivered water being in proportion to form a beverage having a predetermined ratio of said powder flavorant to said delivered water, (v) a holding tank associated with each serving station communication with said mixing chamber for holding said beverage, (vi) a dispensing mechanism associated with each serving station for selective dispensing said beverage from said holding tank at essentially said predetermined rate, and (vii) a first sensing element associated with each holding tank for generating a signal when said beverage recedes below a predetermined level; and (c) a controller responsive to said signal for activating said water delivery system and said metering component until said beverage returns to said predetermined level in said holding tank.

2. The apparatus of claim 1 in which said mixing area is in a mixing chamber positioned above said holding tank.

3. The apparatus of claim 1 in which said mixing area is in said holding tank.

4. The apparatus of claim 1 in which said reservoir is elevated with respect to said components and establishes said water pressure through gravity.

5. The apparatus of claim 4 in which said water delivery system includes a valve responsive to said controller and opening a water line between said reservoir and said mixing area in response to said controller, said valve, water line, and said reservoir collectively delivering water at said essentially first predetermined rate to said mixing area.

6. The apparatus of claim 4 in which said metering component comprises an auger operatively associated with said hopper and in contact with said powder flavorant and an auger motor connected to said auger, said auger motor being activated by said controller.

7. The apparatus of claim 4 in which said dispensing mechanism is a valve adapted to be opened and closed by a user.

8. The apparatus of claim 7 in which said dispensing mechanism further includes an outlet selectively opened and closed by said valve and a filter basket positioned over said valve to filter undissolved powder flavorant particles from being dispensed with said beverage.

9. The apparatus of claim 2 including a whipping chamber with a rotating member associated with each serving station, positioned below said mixing chamber, and in communication with said mixing chamber and said holding tank whereby said whipping chamber assists in the dissolution of said powder flavorant into said water.

10. A beverage making and dispensing apparatus for the delivery of a beverage in a predetermined ratio of powder flavorant to water to a beverage holding tank at essentially the same rate of dispensing of said beverage from said beverage holding tank, said apparatus comprising (a) a reservoir of water connected by a line normally closed by a first valve to a remote supply of water, said reservoir establishing water at a predetermined pressure at an outlet thereto;

(b) a plurality of beverage serving systems each having the following components:

(I) a storage container of powder flavorant,
a powder dispensing mechanism associated with said container,
a water delivery system collectively with the predetermined pressure for delivering water at a predetermined rate, (ii) a mixing area for receiving and mixing said powder flavorant provided by said metering mechanism and water delivered at said predetermined rate from said water delivery system, (iii) a holding tank for holding a predetermined quantity of beverage mixed in said mixing area, and (iv) a beverage dispensing mechanism for dispensing beverage at essentially said predetermined rate from said holding tank; and (c) control means sensing when said beverage is being dispensed from said holding tank and activating said water delivery system to maintain said predetermined quantity of said beverage in said holding tank.

11. The apparatus of claim 10 in which said reservoir holds water in a greater volume than the sum of the volumes of said holding tanks.

12. The apparatus of claim 11 in which said reservoir is elevated above said components and establishes said predetermined pressure by gravity.

13. The apparatus of claim 10 in which said mixing area is in a mixing chamber positioned above said holding tank.

14. The apparatus of claim 10 in which said mixing area is within said holding tank.

15. The apparatus of claim 10 including a sensing element associated with said reservoir for determining when water in said reservoir is below a predetermined level, said control means responsive to said sensing element for opening said first valve until said water in said reservoir returns to said level.

* * * * *